(12) United States Patent
Pei et al.

(10) Patent No.: US 10,334,166 B2
(45) Date of Patent: Jun. 25, 2019

(54) DISTRIBUTED VIDEO PANORAMIC DISPLAY SYSTEM

(71) Applicant: SHENZHEN UNIVERSITY, Shenzhen, Guangdong (CN)

(72) Inventors: Jihong Pei, Guangdong (CN); Kai Sun, Guangdong (CN); Xuan Yang, Guangdong (CN); Weixin Xie, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 58 days.

(21) Appl. No.: 15/828,403

(22) Filed: Nov. 30, 2017

(65) Prior Publication Data

US 2018/0091736 A1 Mar. 29, 2018

Related U.S. Application Data

(63) Continuation of application No. PCT/CN2016/085679, filed on Jun. 14, 2016.

(30) Foreign Application Priority Data

Dec. 14, 2015 (CN) .......................... 2015 1 0925910

(51) Int. Cl.
*H04N 5/228* (2006.01)
*H04N 5/232* (2006.01)
(Continued)

(52) U.S. Cl.
CPC ......... *H04N 5/23238* (2013.01); *G03B 37/04* (2013.01); *G06T 7/30* (2017.01); *G06T 7/80* (2017.01); *H04N 5/247* (2013.01); *H04N 7/18* (2013.01); *H04N 7/181* (2013.01); *H04N 21/21805* (2013.01); *H04N 21/2365* (2013.01); *G06T 2207/30232* (2013.01); *G08B 13/19645* (2013.01); *G08B 13/19682* (2013.01)

(58) Field of Classification Search
CPC ................................. H04N 7/18; H04N 5/228
USPC ..................................... 348/36–61, 142–160
See application file for complete search history.

(56) References Cited

U.S. PATENT DOCUMENTS 7,623,152 B1 * 11/2009 Kaplinsky ............... G06T 7/254
348/155

FOREIGN PATENT DOCUMENTS

CN 105450945 A 3/2016

OTHER PUBLICATIONS

International Search Report of PCT Patent Application No. PCT/CN2016/085679 dated Aug. 19, 2016.

* cited by examiner

*Primary Examiner* — Anand S Rao

(57) ABSTRACT

The present disclosure relates to a distributed video panoramic display system. The present disclosure collects video images of different areas through an existing camera network; the video images collected by each camera are converted into the same coordinate system by each video splitting node in a video splitting module; a plurality of paths of video image data are subjected to parallel splitting processing, so that a display area of each split video image block in a panoramic display unit respectively corresponds to a separate display screen; and each video reorganization node in a video reorganization module is used to perform reorganization processing on each received video image block, then each path of video image formed after the processing is output to the corresponding display screen of the panoramic display unit, and a panoramic video image is formed.

9 Claims, 3 Drawing Sheets

(51) Int. Cl.
*H04N 7/18* (2006.01)
*G06T 7/80* (2017.01)
*G06T 7/30* (2017.01)
*G03B 37/04* (2006.01)
*H04N 5/247* (2006.01)
*H04N 21/218* (2011.01)
*H04N 21/2365* (2011.01)
*G08B 13/196* (2006.01)

DISTRIBUTED VIDEO PANORAMIC DISPLAY SYSTEM

CROSS-REFERENCE TO RELATED APPLICATIONS

This application is a continuation application of PCT Application No. PCT/CN2016/085679 filed on Jun. 14, 2016 which claims priority to Chinese Application No. 201510925910.5 filed on Dec. 14, 2015, the entire contents of which are hereby incorporated by reference.

TECHNICAL FIELD

The present disclosure relates to the field of security monitoring, in particular to a distributed video panoramic display system.

BACKGROUND

In the traditional video surveillance system, the video image captured by each camera reflects only a partial view of a scene, resulting in the absence of correlation between images captured from different cameras. The movements of a moving target from a field of view of one camera to that of another camera often cause visual confusion of monitoring personnel. In particular, when the fields of view of different cameras overlap, the target will appear in multiple video images so that it is difficult for relevant personnel to track the continuous movement of the target. Since the surveillance device being widely used, the coverage of the video surveillance being expanded and the network technology being rapidly developed, there is more and more desired to have a security system capable of centralized processing, viewing and analyzing the video images from multiple surveillance cameras.

SUMMARY

Technical Problem

The object of the present disclosure is to provide a distributed video panoramic display system, enabling to incorporate all video images captured by all cameras mounted in an area into a specific coordinate system, such that a video panoramic image can be constructed.

Technical Solution

The present disclosure is implemented as follows:
a distributed video panoramic display system, comprising a video capturing unit, a distributed processing center and a panoramic display unit;
wherein the video capturing unit includes a plurality of cameras, and each of the cameras is configured to capture video images of different areas; wherein the panoramic display unit is formed by a plurality of display screens joint together;
the distributed processing center includes a data exchange device, a center server, a video splitting module, a video recombination module, and a video output array; wherein the video splitting module includes a plurality of video splitting nodes which are one-to-one mapped to the plurality of cameras; the video recombination module includes a plurality of video recombination node; the plurality of video recombination node is one-to-one mapped to the plurality of display screen;
the center server is connected to each of the cameras via the data exchange device; the center server stores a plurality of nominal parameters of each of cameras, and the center server is configured to, based on the nominal parameter of each of the cameras, determine a display region on the panoramic display unit for the video image being incorporated into a coordinate system via projective transformation after captured by each of the cameras;
the video splitting node is connected to the data exchange device; each of the video splitting nodes is configured to, based on the nominal parameters of the camera, transform the video image captured by the camera into the coordinate system via projective transformation, and then split the video image captured by the camera based on the display region on the panoramic display unit where the video image being transformed into the coordinate system is displayed, such that the respective video image block split from the video image according to the respective display region on the panoramic display unit is mapped to the respective display screen, and then each of the video image blocks is transmitted to the video recombination node mapped to the display screen which is mapped to the display region on the panoramic display unit; and
each of the video combination nodes is configured to recombine the received video images to form an entire video image, and the entire video image is then transmitted to the panoramic display unit via the video output array and is displayed on the display screen mapped to the video recombination node.

Furthermore, the distributed video panoramic display system further comprises a video image storage unit; the video image storage unit is connected to each of the cameras for storing the video image captured by the respective cameras; the center server is further connected to the video image storage unit for reading the video image captured by the respective cameras from the video image storage unit.

Furthermore, the distributed video panoramic display system further comprises a center monitoring screen; the center server is further connected to the video recombination module for receiving the video images which are recombined and resolution-compressed by the video recombination module, and jointing the received video images which are recombined and resolution-compressed by the video recombination module together to form a panoramic video image, and then transmitting the panoramic video image to the center monitoring screen for displaying; the center monitoring screen is a single-piece screen.

Furthermore, the distributed processing center further comprises a panoramic video image storage module; the center server is further configured to encode the panoramic video image and transmits the encoded panoramic video image to the panoramic video image storage module for being stored; the panoramic display system further comprises an accessing module connected to the panoramic video image storage module; the external client is connectable to the accessing module, enabling the search of the panoramic video image stored in the panoramic video image storage module via the accessing module.

Furthermore, the distributed processing center further comprises a heat-removal system configured to cool the distributed processing center.

Furthermore, the distributed processing center further comprises a power management module configured to manage the power of the distributed processing center.

Furthermore, the data exchange device is a switch.

Furthermore, the center server receives the video image via the data exchange device, and computes the nominal parameter of respective camera according to the received video image from the respective camera, and then stores the nominal parameter of respective camera.

Furthermore, the video image is compressed before being output from the respective camera; the respective video splitting module compresses the image blocks before the image blocks are output therefrom.

Beneficial Effect

As compared to the prior art, the present disclosure utilizes the existing camera array to capture video images of various areas, and then convert the video images of various areas captured by the cameras into an identical coordinate system via the video splitting node of the video splitting module, and at the same time the video image data is split as well so that the display region on the panoramic display unit for the image blocks are mapped to a single display screen respectively. The video recombination node of the video recombination module is further used to recombine the received video image blocks and output the recombined video images to the corresponding display screen in the panoramic display unit, such that a panoramic video image is formed. The present disclosure performs projective transformation, splitting, and recombination processing to the video image of various areas captured by respective camera in a distributed parallel processing way, enabling the disorder surveillance video images of an area to be incorporated into an identical coordinate system rapidly for a panoramic display. In this way, the relevant personnel can view and analyze the surveillance video image of the surveillance area as an entirety, leading to the efficiency improvement of video surveillance.

DETAILED DESCRIPTION

In order to better understand the objects, technical solution and merits of the present disclosure, the present disclosure will be further described in detail with reference to the drawings and embodiments.

Figure 1:
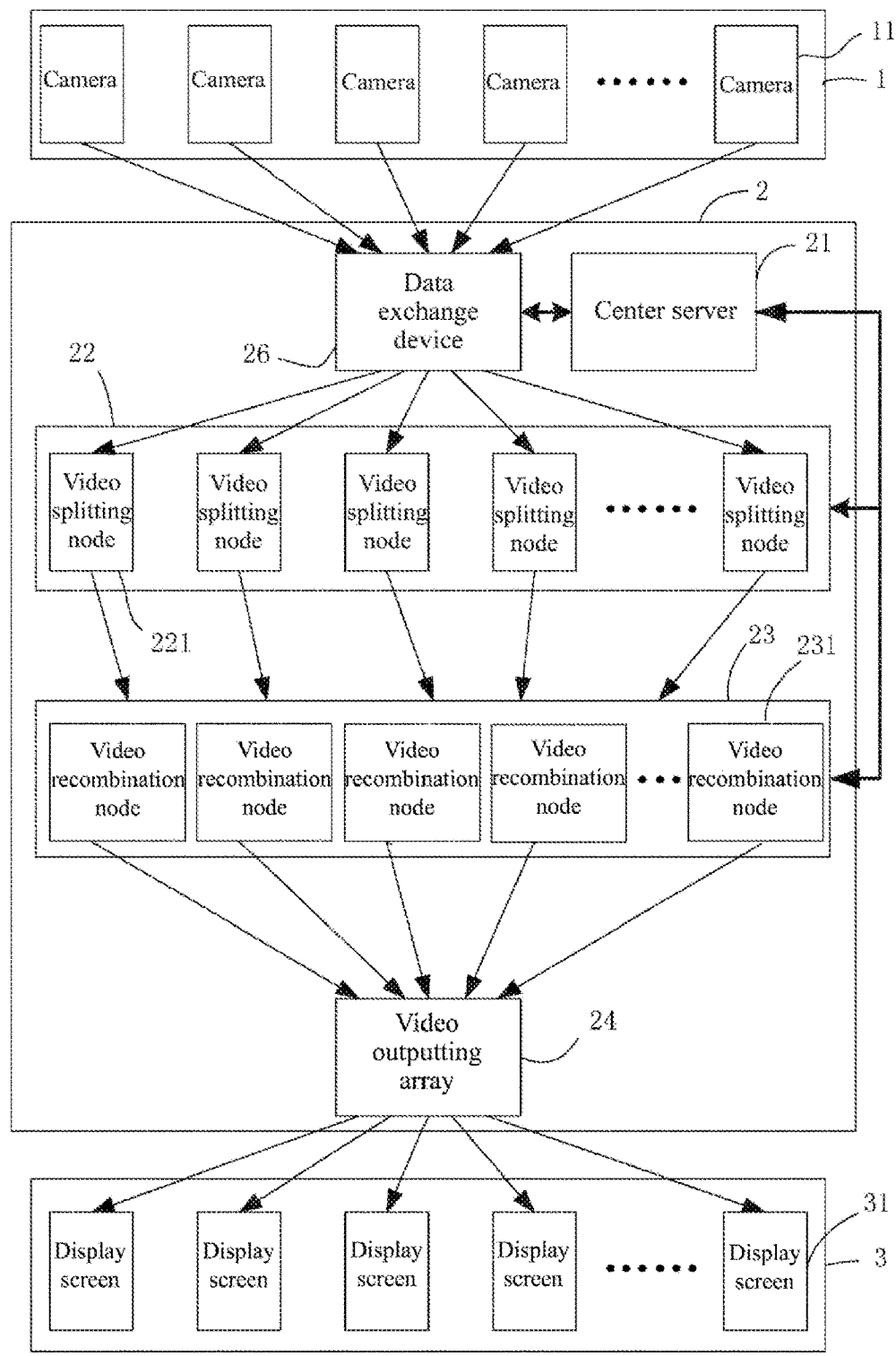
FIG. 1 is a schematic diagram of a distributed video panoramic display system according to the present invention.

As shown in FIG. 1, a distributed video panoramic display system provided in the present disclosure includes a video capturing unit 1, a distributed processing center 2, and a panoramic display unit 3.

The video capturing unit 1 includes a plurality of cameras 11, and each of the cameras 11 is configured to capture video images of different areas; a plurality of display screens 31 joint together to form the panoramic display unit 3.

The distributed processing center 2 includes a data exchange device 26, a center server 21, a video splitting module 22, a video recombination module 23, and a video output array 24. The video splitting module 22 includes a plurality of video splitting nodes 221 which are one-to-one mapped to the plurality of cameras 11. The video recombination module 23 includes a plurality of video recombination nodes 231; the plurality of video recombination nodes 231 is one-to-one mapped to the plurality of display screens 31.

The center server 21 is connected to each of the cameras 11 via the data exchange device 26. The center server 21 stores a plurality of nominal parameters of the plurality of cameras 11. Alternatively, the center server 21 can receive video images from each of the cameras 11 via the data exchanger device 26, and compute the nominal parameters of each camera 11 according to the received video images, and then store the nominal parameters of the camera 11 accordingly. The center server 21 is configured to, based on the nominal parameter of each of the cameras 11, determine a display region on the panoramic display unit 3 for the video image which is incorporated into a coordinate system with projective transformation after captured by each of the cameras 11. The data exchange device 26 can be a switch, and the center server 21 can receive the video images captured by the cameras 11 via the switch. The projective transformation for the video image captured by the cameras 11 is carried out based on the nominal parameters of the cameras 11. The procedure of projective transformation will not be described.

Figure 2:
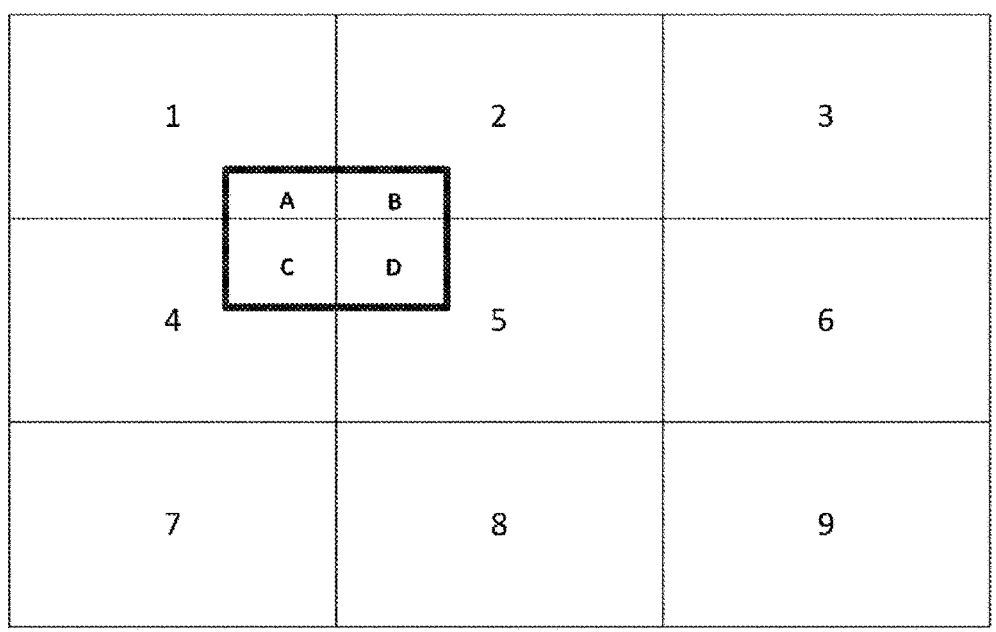
FIG. 2 is a schematic diagram illustrates splitting in the distributed video panoramic display system according to the present invention.

Each of the video splitting nodes 221 is connected to the data exchange device 26. Each of the video splitting nodes 221 is configured to, based on the nominal parameter of the camera 11, transform the video image captured by the camera 11 into the coordinate system via projective transformation, and each of the video splitting nodes 221 is configured to split the video image captured by the camera 11 based on the display region on the panoramic display unit 3 where the video image being transformed into the coordinate system is displayed, such that the respective display region on the panoramic display unit 3 where the respective video image block split from the video image is displayed is mapped to the respective display screen 31. Then each of the video image blocks is respectively transmitted to the video recombination node 231 mapped to the display screen 31 which is mapped to the display region on the panoramic display unit 3. For example, as shown in FIG. 2, the panoramic display unit 3 is formed by jointing 9 display screens 31 (the rectangular region labeled by reference numerals 1-9). After projective transformation, the video image captured by the first camera 11 which is projected on the display region (the black bold rectangle shown in FIG. 2) of the panoramic display unit 3 covers partial regions of each of the first, second, fourth and fifth display screen 31, and therefore the first video splitting node 221 is required to split the video image into four video image blocks, i.e. parts A, B, C, D. The display regions on the panoramic display unit 3 for the four video image blocks are respectively mapped to the first, second, fourth, fifth display screen 31. That is, the video image blocks in parts A, B, C, D are displayed on the first, second, fourth, fifth display screen 31, respectively. Accordingly, the first video splitting node 221 is required to transmit the video image blocks in parts A, B, C, D to the video recombination nodes 231 mapped to the first, second, fourth, fifth display screens 31 respectively. Illustrated by the case of the video image block in part B, it can be displayed on the second display screen 31. That is, the display region on the panoramic display unit 3 for the video image block in part B is mapped to the second display screen 31. Accordingly, the first video splitting node 221 needs to transmit the video image block in part B to the video recombination node 231 which is mapped to the second display screen 31. Other video splitting nodes 221 can work in the same way.

Each of the video combination nodes 231 is configured to recombine the received video images to form an entire video image, and the entire video image is then transmitted to the panoramic display unit 3 via the video output array 24 and is displayed on the display screen 31 of the panoramic display unit 3 mapped to the video recombination node 231. Still referring to FIG. 2, the other video splitting nodes 221 also perform projective transformation and splitting for the respective received video image to obtain the video image blocks. And the other video splitting nodes 221 transmit the video image blocks to video recombination node 231 mapped to the display screen 31 which is mapped to the display region on the panoramic display unit 3 for the respective video image block. In this way, the video recombination node 231 corresponding to the identical display screen 31 will receive a number of video image blocks which are transmitted by different video splitting nodes 221 but mapped to the identical display screen 31. That is, these image blocks will be displayed on a single identical display screen 31. In the case where the second display screen 31 is taken as an example, the video recombination node 231 mapped to the second display screen 31 receives a number of video image blocks (including the video image block in part B transmitted by the first video splitting node 221), and recombines the various received video image blocks to form an entire video image. The entire video image will be displayed on the second display screen 31 in its entirety. That is, the display region on the panoramic display unit 3 for said entire video image is completely mapped to the second display screen 31. Other video recombination nodes 231 can work in the same way. In this way, when each video recombination node 231 transmits the respective recombined video images to the display screen 31 on the panoramic display unit 3 via the video output array 24, the images in respective display screen 31 together forms a panoramic video image.

Figure 3:
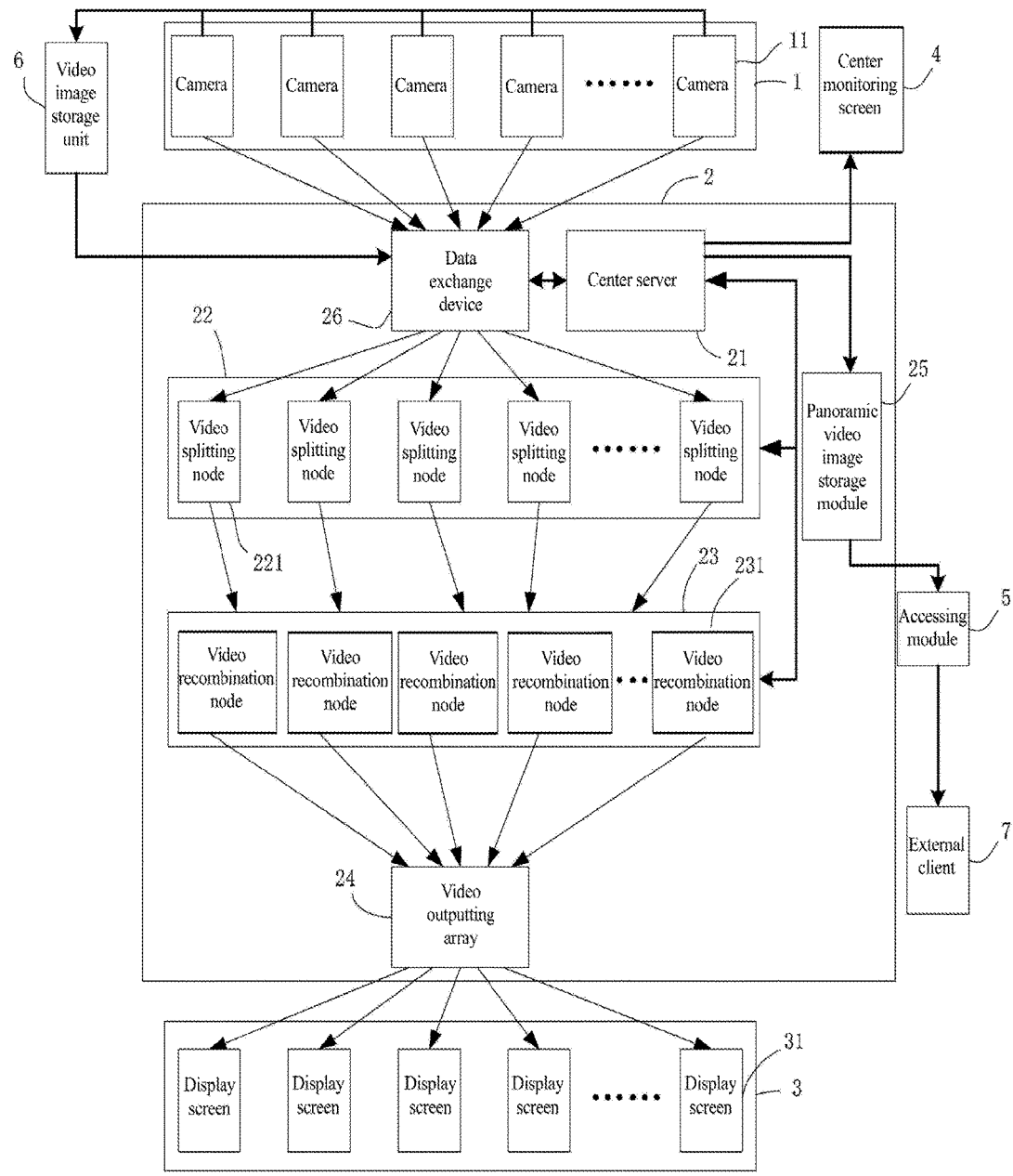
FIG. 3 is a schematic diagram of a distributed video panoramic display system according to the present invention with further components.

Furthermore, as shown in FIG. 3, the distributed video panoramic display system further comprises a video image storage unit 6, wherein the video image storage unit 6 is connected to each of the cameras 11 for storing the video images captured by the respective cameras 11; the center server 21 is further connected to the video image storage unit 6 for reading the video images captured by the respective cameras 11 from the video image storage unit 6. In this way, not only can the video images of the different areas captured by the cameras 11 be displayed in their entirety in real time, but also can the historical video images captured by the cameras 11 be displayed in their entirety.

The distributed video panoramic display system further comprises a center monitoring screen 4; the center server 21 is further connected to the video recombination module 23 for receiving the video images which are recombined and resolution-compressed by the video recombination module 231. And then the center server 21 joints the received video images which are recombined and resolution-compressed by the video recombination module 231 together to form a panoramic video image, and then transmits the panoramic video image to the center monitoring screen 4 for displaying. The center monitoring screen 4 is a single-piece screen whose resolution is generally much lower than the sum of the resolutions of the respective display screens 31 of the panoramic display unit 3. For example, it is possible to use a conventional computer screen 31 as a center monitoring screen 4 to facilitate monitoring on a computer.

Furthermore, the distributed processing center 2 further comprises a panoramic video image storage module 25. The center server 21 is further configured to encode the panoramic video image and transmits the encoded panoramic video image to the panoramic video image storage module 25 for being stored. The panoramic display system further comprises an accessing module 5 which is connected to the panoramic video image storage module 25. An external client 7 can be connected to the accessing module 5, enabling the search of the panoramic video image stored in the panoramic video image storage module 25 via the accessing module 5. Conventionally, the external client 7 can be connected to the accessing module 5 via the internet.

Furthermore, the distributed processing center 2 further comprises a heat-removal system configured for cooling the distributed processing center 2 and a power management module configured to manage the power of the distributed processing center 2.

In order to improve the transmission efficiency, each camera 11 first compresses the captured video images before the video image being outputted, and then transmits the compressed video images to the video splitting node 221 mapped to the camera 11 via the data exchange device 26. The respective video splitting node 221 decompresses the received video image to perform projective transformation and splitting. After being split, the respective video image block is compressed again and then transmitted to the corresponding video recombination node 231. The video recombination node 231 decompresses the received video image blocks to perform recombination processing. The aforementioned compression and decompression are performed according to H.264 format.

The foregoing is only a preferred embodiment of the present disclosure and is not intended to limit the present disclosure. Any modification, equivalents and improvements within the spirit and principle of the present disclosure are intended to be included within the scope of the present disclosure.

What is claimed is:

1. A distributed video panoramic display system, comprising:
    a video capturing unit;
    a distributed processing center; and
    a panoramic display unit;
    wherein the video capturing unit comprises a plurality of cameras, each camera is configured to capture video images of different areas;
    wherein the panoramic display unit is formed by a plurality of display screens joint together;
    wherein the distributed processing center comprises a data exchange device, a center server, a video splitting module, a video recombination module, and a video output array; wherein the video splitting module comprises a plurality of video splitting nodes which are one-to-one mapped to the plurality of cameras; the video recombination module includes a plurality of video recombination nodes; the plurality of video recombination node is one-to-one mapped to the plurality of display screen;
    wherein the center server is connected to each of the cameras via the data exchange device; the center server stores a plurality of nominal parameters of each of the cameras, and the center server is configured to, based on the nominal parameters of each of the cameras, determine a display region on the panoramic display unit for the video image being incorporated into a coordinate system via projective transformation after captured by each of the cameras;

wherein the video splitting node is connected to the data exchange device, each of the video splitting nodes is configured to, based on the nominal parameters of the camera, transform the video image captured by the camera into the coordinate system via projective transformation, and then split the video image captured by the camera based on the display region on the panoramic display unit where the video image being transformed into the coordinate system is displayed, such that the respective video image block split from the video image according to the respective display region on the panoramic display unit is mapped to the respective display screen, and then each of the video image blocks is transmitted to the video recombination node mapped to the display screen which is mapped to the display region on the panoramic display unit; and wherein each of the video recombination nodes is configured to recombine the received video images to form an entire video image, and the entire video image is then transmitted to the panoramic display unit via the video output array and is displayed on the display screen mapped to the video recombination node.

2. The distributed video panoramic display system of claim 1, further comprising a video image storage unit; the video image storage unit is connected to each of the cameras for storing the video image captured by the respective cameras; the center server is further connected to the video image storage unit for reading the video image captured by the respective cameras from the video image storage unit.

3. The distributed video panoramic display system of claim 1, further comprising a center monitoring screen; the center server is further connected to the video recombination module for receiving the video images which are recombined and resolution-compressed by the video recombination module, and jointing the received video images which are recombined and resolution-compressed by the video recombination module together to form a panoramic video image, and then transmitting the panoramic video image to the center monitoring screen for displaying; the center monitoring screen is a single-piece screen.

4. The distributed video panoramic display system of claim 3, wherein the distributed processing center further comprises a panoramic video image storage module; the center server is further configured to encode the panoramic video image and transmits the encoded panoramic video image to the panoramic video image storage module for being stored; the panoramic display system further comprises an accessing module connected to the panoramic video image storage module; the external client is connectable to the accessing module, enabling the search of the panoramic video image stored in the panoramic video image storage module via the accessing module.

5. The distributed video panoramic display system of claim 1, wherein the distributed processing center further comprises a heat-removal system configured to cool the distributed processing center.

6. The distributed video panoramic display system of claim 1, wherein the distributed processing center further comprises a power management module configured to manage the power of the distributed processing center.

7. The distributed video panoramic display system of claim 1, wherein the data exchange device is a switch.

8. The distributed video panoramic display system of claim 1, wherein the center server receives the video image via the data exchange device, and computes the nominal parameter of respective camera according to the received video image from the respective camera, and then stores the nominal parameter of respective camera.

9. The distributed video panoramic display system of claim 8, wherein the video image is compressed before being output from the respective camera; the respective video splitting module compresses the image blocks before the image blocks are output therefrom.

* * * * *